United States Patent
Benedict et al.

(10) Patent No.: US 6,722,192 B2
(45) Date of Patent: Apr. 20, 2004

(54) DEVICE FOR DETECTING THE TIRE PRESSURE OF A MOTOR VEHICLE TIRE

(75) Inventors: Robert Leon Benedict, Tallmadge, OH (US); Franz Hillenmayer, Burglengenfeld (DE); Tony W Parsons, Luxembourg (LU); Peter Ross Shepler, Stow, OH (US); Dieter Wagner, Laaber (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/375,378

(22) Filed: Feb. 27, 2003

(65) Prior Publication Data

US 2003/0172729 A1 Sep. 18, 2003

(30) Foreign Application Priority Data

Mar. 12, 2002 (EP) .............................. 02005633

(51) Int. Cl.$^7$ .............................. G01M 17/02
(52) U.S. Cl. ...................... 73/146; 73/146.3
(58) Field of Search .................. 73/146–146.8

(56) References Cited

U.S. PATENT DOCUMENTS

| | | | | |
|---|---|---|---|---|
| 4,072,926 A | * | 2/1978 | Shimahara et al. | 340/448 |
| 4,117,452 A | * | 9/1978 | Snyder et al. | 340/443 |
| 4,160,234 A | * | 7/1979 | Karbo et al. | 340/443 |
| 4,531,112 A | * | 7/1985 | Thomas | 340/447 |
| 4,695,823 A | * | 9/1987 | Vernon | 340/447 |
| 5,040,562 A | * | 8/1991 | Achterholt | 137/227 |
| 5,731,516 A | * | 3/1998 | Handfield et al. | 73/146.5 |
| 5,969,239 A | * | 10/1999 | Tromeur et al. | 73/146.5 |
| 6,199,575 B1 | * | 3/2001 | Widner | 137/227 |

FOREIGN PATENT DOCUMENTS

EP       0 657 836 A1      4/1994

* cited by examiner

*Primary Examiner*—Edward Lefkowitz
*Assistant Examiner*—Jermaine Jenkins
(74) *Attorney, Agent, or Firm*—Richard B. O'Planick

(57) ABSTRACT

A device for detecting the tire pressure of a motor vehicle tire (6) has an electronic unit (1) with an antenna (2) that is connected therewith. The electronic unit (1) and the antenna (2) are mounted on an elastic, circular support (3), which is fixed coaxially to the wheel axle (8) on the tire sidewall (7) in proximity of the wheel rim (5). The support (3) is fixed to the tire (6) only with its inner circumferential side while the outer circumferential side protrudes freely into the interior of the tire.

19 Claims, 2 Drawing Sheets

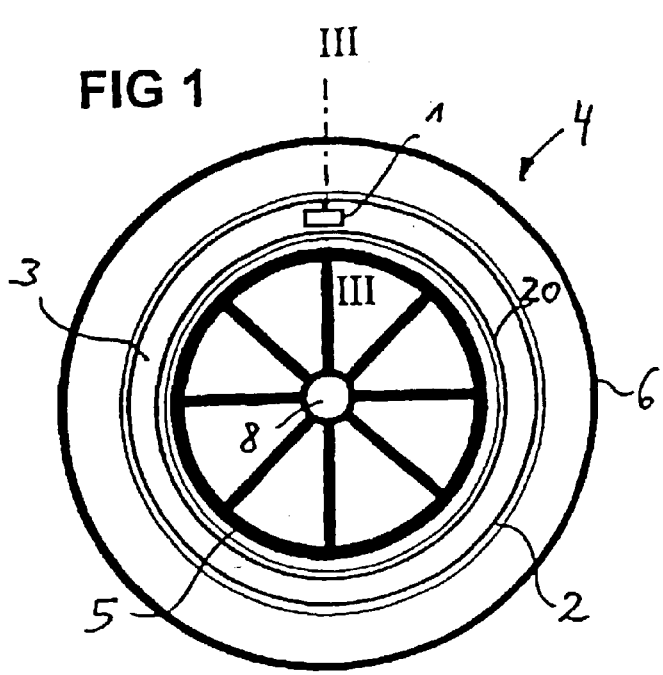
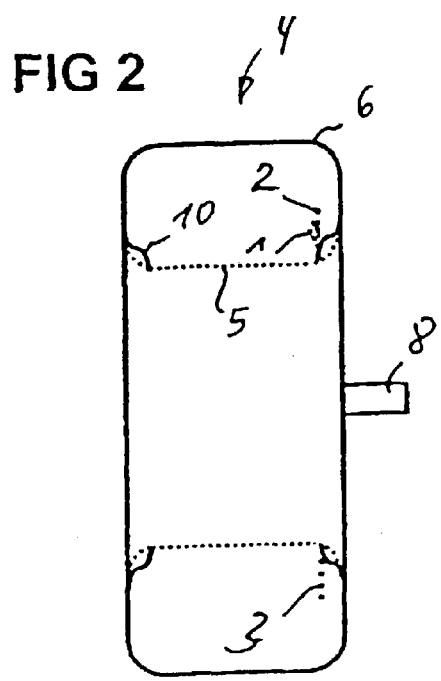
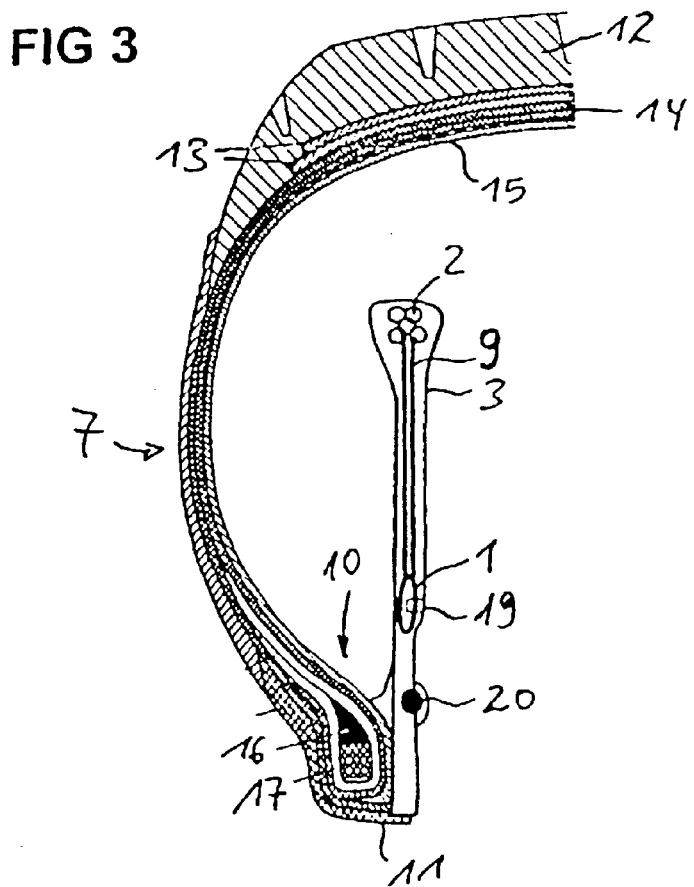

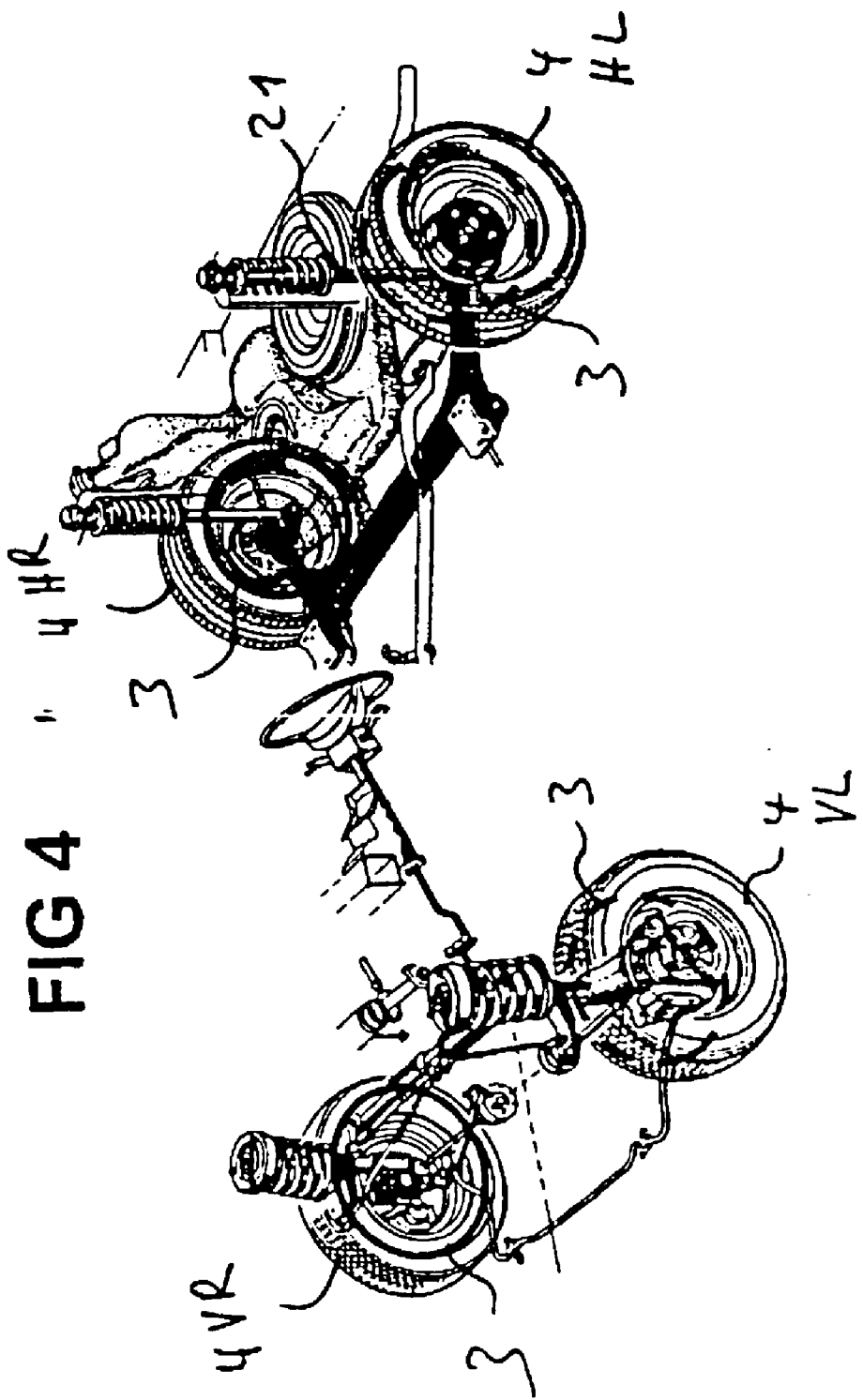

DEVICE FOR DETECTING THE TIRE PRESSURE OF A MOTOR VEHICLE TIRE

TECHNICAL FIELD

The invention relates to a device for detecting the tire pressure of a motor vehicle tire.

BACKGROUND OF THE INVENTION

For safety reasons, the tire pressure of motor vehicle tires must be checked regularly. For this purpose, devices for detecting the tire pressure are arranged in every tire. These devices comprise at least one pressure sensor that measures the tire pressure. The measured value is then transmitted in a signal via an antenna with the aid of a transmitter to a vehicle-side receiver. Transmission can occur intermittently at predefined time intervals or after receipt of a prompting signal sent by a vehicle-side transmitter. The energy required to send the pressure signal back to the vehicle can be transmitted to the device along with the prompting signal.

The pressure signal can also include an individual tire identification. This identification is stored in the electronic unit of each tire. The pressure signals received by the vehicle-side receivers are supplied to a central vehicle-side evaluation unit in which each signal is evaluated and the measured pressure is compared with permissible reference values. If the measured pressure differs from the reference value, a display is activated, which prompts the driver to take suitable measures (changing the tire or adding air). As a safety measure, several measurements may be taken to determine a mean value or a time-dependent value, which is then compared with the reference value, which can also change as a function of time.

A prior art device (EP 0 657 836 B1) comprises an electronic unit, which is arranged on a tire of the vehicle. A coil that is mounted along the circumference of the tire and is completely fixed to the inner tire wall or the inner tire tread is connected to this electronic unit. The electronic unit is used to measure the pressure inside the tire. Upon receipt of a prompting signal emitted by the vehicle-side antenna, the pressure signal is radio transmitted via the antenna to the vehicle-side receiving antenna.

When the vehicle is traveling (i.e. the wheels are rotating), the tires are deformed on the one hand due to the load of the vehicle (roller leveling in the contact area) and on the other hand due to the centrifugal force. Since the antenna in the prior art device is fixed directly to the interior of the tire wall, the antenna is subject to a large mechanical load, particularly if the tire is exposed to additional substantial shocks, e.g. from driving over a curbstone or a speed ramp. The prior art antenna is firmly affixed to the elastic tire. As a consequence, there is a risk that the antenna will break, since it is less elastic than the rubber tire.

SUMMARY OF THE INVENTION

The object of the invention is to provide a device for detecting the tire pressure in a motor vehicle tire, the electronic components of which will reliably function over a relatively long service life.

According to the invention, this object is attainted by a device for detecting the tire pressure of a motor vehicle tire with the features of claim 1. This device comprises an electronic unit, which is connected to an antenna. Both the electronic unit and the antenna are arranged on a slightly elastic support in the form of an annular disk, the inner circumference of which is mounted to the tire while the outer circumference side freely projects into the interior of the tire.

Due to this single-sided fixation to the tire and the elastic flexible support, vibrations and mechanical loads that act on the tire are transmitted only in an attenuated manner to the support and its electronic unit as well as the antenna. Consequently, the mechanical loads applied to these electronic components during operation of the vehicle are minor.

In the device according to the invention, the antenna is arranged around the wheel rim and approximately coaxially to the wheel axle. This axially symmetrical arrangement largely avoids additional imbalances. Since the antenna is arranged over the circumference of the tire, data can be readily transmitted back and forth between the antenna and a vehicle-side antenna if the vehicle-side antenna is arranged in proximity to the wheel.

Through this support, the entire weight of the support plus the electronic unit and the antenna is distributed about equally over the circumference, so that only minor imbalances associated with the support act on the wheel and thus the driving stability.

The mounting of the support to the tire can be integrated in the tire production process. The support and thus the electronic unit are then permanently associated with the tire. Such a support can also be added or replaced for each tire whenever the tire is changed or repaired.

Advantageous embodiments of the invention are set forth in the dependent claims. For instance, the antenna can be arranged as a coil with one or several turns along the circumference of the support and can be largely surrounded by the support material. As a result, the antenna itself is protected from environmental influences. If the support is made of a flexible material, vibrations that are due to mechanical effects on the tire and are transmitted to the support are dampened. As the wheels rotate, there is no compression of the ring. Even if the tire is exposed to extreme loads (e.g. in cornering) or extreme compression (moving the tire over a sharp edge) and the tire contacts the support as a result, the support due to its flexibility or elasticity, can absorb the mechanical load to a large extent such that the antenna and the electronic unit are largely protected.

The support with its antenna is preferably mounted to the inner tire wall facing the vehicle side in the area of the tire bead. Thus, the antenna is arranged as close as possible to a vehicle-side antenna, which is typically arranged in proximity of the wheel or the suspension strut. As a result, little energy is required to transmit the signals. In devices with their own power supply (battery), the power supply is consequently conserved and lasts longer. In devices without a battery (transponder method), less energy needs to be transmitted to the device to enable the return of the pressure signal.

Since the two antennas are arranged close together, the data can be transmitted after modulation with low carrier frequencies. These signals have a short range in any case. This has the advantage, however, that the devices in the other tires of the vehicle do not pick up the pressure signals. As a result, it is possible uniquely to assign each device in a corresponding tire to the respective wheel position.

The support can be produced by injection molding and the antenna and the electronic unit can be molded into the support during this process, so that they are surrounded and protected by the support material. To enable the tire pressure to be measured exactly by a pressure sensor of the electronic unit, the support material is provided with a hole in the area of the electronic unit, which forms an air duct between the air in the tire and the pressure sensor.

The support can also be made of a flexible, electrically insulating material that encloses the antenna and the electronic unit after suitable cutting and folding of the material. Here, too, care must be taken that an air duct is provided to the electronic unit, so that the pressure in the tire can be measured accurately and without distortion.

The support preferably has an approximately rectangular profile cross-section. Depending on the number of turns of the coil antenna and the size of the electronic unit and its enclosure, the profile cross-section of the support can also be T-shaped or approximately L-shaped.

To avoid excessive mechanical loading of the support during travel, i.e. wheel rotation, the support is provided with a approximately ring-shaped reinforcing element in the area of the tire bead. As the wheel rotates, this reinforcing element mechanically stabilizes and relieves the support by reducing the tensile load on the support.

BRIEF DESCRIPTION OF THE DRAWINGS

An embodiment of the invention will now be described, by way of example, with reference to the schematic drawings in which:

FIG. 1 is a side view of a tire with an inventive device for detecting the tire pressure of a motor vehicle tire;

FIG. 2 is a front view of the tire shown in FIG. 1;

FIG. 3 is a section through the tire along line III—III in FIG. 1 (enlarged view); and FIG. 4 is a schematic view of the four wheels of a motor vehicle in which an inventive device according to FIG. 1 is installed.

DETAILED DESCRIPTION OF THE PREFERRED EMBODIMENTS

An inventive device for detecting the tire pressure of a motor vehicle tire has an electronic unit (FIG. 1), which comprises at least one pressure sensor (not depicted) and possibly a temperature sensor. Electronic unit 1 may also include other sensors, e.g. an acceleration sensor, a centrifugal sensor, a speed sensor, or a motor sensor. These sensors can be used, for instance, to trigger the emission of a pressure signal starting from a predefined measured value of a corresponding physical quantity, initialization (tire ID is communicated to the evaluation unit), or localization (the detected wheel position is assigned to the ID).

The tire pressure is measured with the pressure sensor. The temperature in the tire is measured with the temperature sensor. This measurement can be used to correct the measured pressure value if necessary. The electronic unit 1 further comprises a transmitter (not depicted) by means of which the measured pressure value is transmitted as a pressure signal via an antenna 2.

In the inventive device for detecting the tire pressure of a motor vehicle tire, the electronic unit 1 and the antenna 2 are arranged on a support 3, which has the shape of an approximately annular disk. FIG. 1 is a section through a wheel 4 with a tire 6 mounted to a wheel rim 5. Support 3 is mounted to a sidewall 7 of tire 6 near the wheel rim 5. Antenna 2 is embodied as a coil with one or more turns extending around wheel rim 5 approximately coaxially to wheel axle 8. Antenna 2 is electrically connected with electronic unit 1 by means of connecting lines 9 (cf. FIG. 3).

FIG. 2 shows a front view of wheel 4. Wheel rim 5 and support 3 are represented by dashed lines, since they are located within the tire 6. From this figure it is readily apparent that support 3 is mounted to the inner sidewall 7, which faces the vehicle side of tire 6. The wheel axle 8, which is located on the same side, represents the vehicle side.

In the enlarged cross-section of tire 6 shown in FIG. 3, the fixation of support 3 to tire 6 in the area of tire bead 10 is clearly visible. Support 3 is glued to tire bead 10 in the area of the circumference that faces the wheel rim 5. Support 3 in this example stands on a foot area 11 of tire 6 (a so-called toeguard). This also avoids sealing problems for the tubeless tire 6, since support 3 does not contact wheel rim 5.

Tire 6 is, for instance, a tubeless radial tire with conventional tire construction comprising a tread 12, one or more belt layers 13 made of steel cord and/or nylon cord, a carcass 14 and an airtight rubber layer 15 to seal tire 6. The device can of course also be used in all other types of tubeless tires in which the inventive support 3 can be fixed to tire 6 in the described manner.

Support 3 is mounted to the lower end of sidewall 7 of tire 6 in the area of bead 10, preferably with full contact along its outer circumferential rim. Bead 10 comprises a bead core 16 with a steel cord 17 for mechanically stabilizing bead 10. The free end (outer support circumference) of support 3 protrudes into the tire interior. Support 3 is fixed within tire 6 such that the outer support periphery has a minimum safety distance all around relative to tire 6, such that support 3 will rarely knock against tire 6 even under the most unfavorable conditions. Thus, due to its elasticity, it cannot be mechanically impaired or damages. Conversely, support 3 due to its elasticity cannot damage the inner wall of the tire.

Antenna 2 is arranged inside support 3 as a coil with one or more turns. Antenna 2 is connected with electronic unit 1 via connecting lines 9. Electronic unit 1 is arranged near bead 10 and thus as close as possible to the wheel axle 8, such that the additional imbalance created by electronic unit 1 during rotation of wheel 4 is as small as possible.

In the area of electronic unit 1, support 3 has an air duct 19, which creates an open connection between the pressure sensor of electronic unit 1 and the air in tire 6. This makes it possible to measure the tire pressure reliably and without distortion.

Near the fixation point of support 3 on tire 6, an annular reinforcing element 20 is arranged. This element largely absorbs the centrifugal forces during rotation of wheels 4. Thus, support 3 is not subject to additional loads due to a tensile force or centrifugal force as wheels 4 rotate. This reinforcing element 20 further serves to stabilize support 3 mechanically.

The profile cross-section of support 3 (as shown in FIG. 3) is approximately T-shaped. This T-shape is due to the five turns of antenna 2 shown here. If there is only one turn, support 3 is thinner along its circumferential rim and the profile cross-section is approximately rectangular. The profile cross-section can also be approximately L-shaped. It is advantageous if the profile cross-section is uniform and constant over the entire circumference. This symmetry prevents any additional imbalance, so that support 3 and the mechanical connection to tire 6 (bonding or vulcanization surface) are not exposed to large mechanical loads.

Support 3 is produced from a flexible elastic material, such as rubber or polyurethane (PUR). This elastic material may also be reinforced by a fabric material. Support 3 can be formed by injection molding and the support material can be injection molded around antenna 2 and electronic unit 1. Antenna 2 and electronic unit 1 are thus completely surrounded by the support material (except for air duct 19). The support material may not be rigid, but must be flexible or resilient, such that vibrations can be dampened by the material and do not expose the fixation of support 3 to tire 6 to excessive mechanical loads. In addition, support 3 must be arranged in tire 6 such that it is relatively vibration stable and will remain in its position even if exposed to relatively substantial shocks. It should also have a certain rigidity, which is achieved, for instance, by the reinforcing fabric.

If support 3 is furthermore made of an electrically insulating material, the material can be injection molded around the turns of antenna 2 as bare wires, which are thus insulated against the other electrically conductive parts. In this case, the electronic unit 1 does not need to be accommodated in a separate enclosure. As a result, electronic unit 1 and antenna 2 will be lighter and therefore represent a smaller imbalance.

The support material used may also be some other flexible material that is reinforced, for instance, by a special fabric (e.g. glass fiber) or by some other suitable material. This material can then be cut and folded (antenna 2 and electronic unit 1 are folded in) to form the shape of support 3. Antenna 2 and electronic unit 1 are thus surrounded by the material. Only air duct 19 is left free to provide a connection between the pressure sensor of electronic unit 1 and the air in the tire, so that the pressure can be reliably measured.

The circumferential, annular reinforcing element 20 can, for instance, be a steel ring. Fiber fabric reinforced materials of the nylon family, such as aramid (known, for instance, under the trade names Kevlar®, Twaron®, or Nomex®) can also be used. Aramid reinforcing fibers have a very high energy absorption capacity (impact strength), very high specific strength and very high tensile strength and vibration damping capacity. They also have good chemical and water resistance.

Support 3, at its end that protrudes freely into the tire interior, is mounted at a distance from tire 6 in radial direction relative to tread 12 and in lateral direction relative sidewall 7. As a result, contact between tire 6 and support 3 is avoided even under the most unfavorable mechanical conditions, so that support 3 is protected. Although support 3 may lean against sidewall 7 of tire 6 during extreme cornering, damage to either tire 6 or support 3 is largely excluded due to the elasticity of the support. For this purpose, support 3 must be sufficiently rigid. Support 3 must nevertheless be elastic, flexible and resilient in order at least to dampen mechanical loads during rotation of wheels 4. Support 3 with its components (antenna 2, electronic unit 1, and reinforcing element 20) should moreover be low in weight.

Support 3 can be fixed to tire bead 10 either by gluing or vulcanizing. Particularly high stability is achieved if support 3 is mounted along the entire inner circumference in the area of tire bead 10. Other functionally equivalent mounting techniques are also possible.

Typical dimensions for support 3, e.g. in a 15-inch tire, are approximately 48 cm for its outside diameter, approximately 38 cm for its inside diameter, and approximately 3 cm for its thickness. The approximately circular support 3 is thus about 5 cm wide.

The weight of electronic unit 1 should be minimized. Currently, electronic unit 1 weighs approximately 3 to 5 g. The heavier the electronic unit 1, the closer toward wheel axle 8 on support 3 it should be mounted in order to prevent excessively large additional imbalances caused by electronic unit 1 during rotation of wheels 4.

Support 3 is shaped somewhat like an oversized shim, which is flexible, however, and can thus be folded. This facilitates storage. Support 3 with antenna 2 and electronic unit 1 can also be mounted subsequently as a replacement part in every tire 6. It is advantageous if support 3 is integrated in tire 6 during the production process of tire 6 or in an expanded production line immediately after production of tire 6. Thus, tires 6 can be easily replaced, without support 3 having to be removed separately. In consequence, support 3 may not be fixed to wheel rim 5, but only to tire 6 itself. This has the additional advantage that identification data (ID) of tire 6, which can be stored in electronic unit 1, is permanently associated with the tire 6/support 3 combination. The manufacturing date, manufacturing parameters, tire type, maximum speed, maximum axle load and/or the appropriate tire pressure range may be used as identification data.

FIG. 4 shows the arrangement of the inventive devices in each vehicle wheel (VR=front right, VL=front left, HR=rear right, HL=rear left). Thus, the tire pressures in each mounted tire 6 can be measured.

Each support 3 is mounted to sidewall 7, which faces the vehicle interior, of the respective tire. If corresponding receiving antennas (not depicted) are arranged on the vehicle-side of wheels 4 (e.g. on suspension strut 21 or near the wheel axle 8), the signals can be easily and reliably transmitted from the devices in the wheels to the receiver on the vehicle-side and from there to a central evaluation unit. Since the antennas are arranged approximately coaxially around the wheel axle 8 or the wheel rim 5, the length of the transmission path between the tire-side antenna 2 and the vehicle-side antenna remains constant. This creates reproducible transmission conditions.

This arrangement of the antennas also enables a reliable assignment of each tire-side device to the corresponding wheel position, since signals from the tire-side devices can be received only via the receivers assigned to the wheel positions. Signals from other wheels can be received only in strongly attenuated form—if they can be received at all. As a result, the sensitivity of the reception can be simply adjusted or only the signals with the largest amplitude are processed.

Preferably, the devices are operated at carrier frequencies of approximately 125 kHz, so that the range of the signals at low transmitting power if very limited in any case (range of typically less than 50 cm). For these frequencies, antennas 2 in the form of coils are particularly suitable, which leads to an inductive transmission of the signals. Thus, antenna 2 can of course be used as both a transmitting and a receiving antenna.

Antenna 2 can have a closed antenna ring (360° antenna). It can also have one or more turns in which case the last turn in the area of the connecting lines is not fully closed. Signals can be transmitted from and to antenna 2 using the transformer principle (i.e., with an additional coupling coil). If the turns are completely closed, a so-called current probe can be used to supply signals to antenna 2 or to pick up signals from antenna 2.

Such an antenna 2 can well withstand the mechanical loads occurring in operation even over a relatively long service life (e.g. over the years during which tire 6 is mounted) because it is arranged in tire 6 in such a way that it is protected by support 3. Support 3 is therefore mechanically configured to last at least for the life of the tire.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is therefore to be understood that changes can be made in the particular embodiments described which will be within the full intended scope of the invention as defined by the following appended claims.

What is claimed is:

1. Device for detecting the tire pressure of a motor vehicle tire, comprising
   an electronic unit (1) equipped with at least one sensor for measuring the tire pressure and at least one transmitter by means of which the measured values are processed for transmissions, and
   at least one antenna (2), which is connected with the transmitter and via which the measured values are transmitted;
   characterized in that the device has an approximately circular support (3) on which the electronic unit (1) and the antenna (2) are arranged and which, with its inner circumferential side, is fixed to tire (6), while the outer circumferential side freely protrudes into the interior of the tire.

2. Device as claimed in claim 1, characterized in that the antenna (2) is arranged along the circumference of the support (3).

3. Device as claimed in claim 1, characterized in that the antenna (2) is arranged in the support (3) and is largely surrounded by the support material.

4. Device as claimed in claim 1, characterized in that the support (3) is made of a flexible or elastic material.

5. Device as claimed in claim 1, characterized in that the support (3) is fixed to the inner sidewall (7), which faces the center of the vehicle, of tire (6) in the area of tire bead (10).

6. Device as claimed in claim 1, characterized in that the support (3) is produced by injection molding, and the support material is injection-molded around antenna (2) and electronic unit (1).

7. Device as claimed in claim 1 characterized in that the support (3) is made from a flexible, electrically insulating material, and the antenna (2) and the electronic unit (1) are enclosed by folding the material.

8. Device as claimed in claim 1, characterized in that the support (3) has an approximately rectangular, approximately T-shaped, or approximately L-shaped profile cross-section.

9. Device as claimed in claim 1, characterized in that the support (3), in an area where it is fixed to a tire bead (10), has an approximately ring-shaped reinforcing element (20), which holds the support (3) in the tire (6) while mechanically stabilizing it.

10. Device as claimed in claim 1, characterized in that, in the area of the electronic unit (1) the support material has a hole, which represents an air duct (19) to a pressure sensor of the electronic unit (1).

11. A tire assembly for detecting the tire pressure of a motor vehicle tire, comprising:
    a tire having an inwardly directed surface facing the tire cavity;
    an electronic unit (1) equipped with at least one sensor for measuring the tire pressure and at least one transmitter by means of which the measured values are processed for transmissions, and
    at least one antenna (2), which is connected with the transmitter and via which the measured values are transmitted;
    characterized in that the device has an approximately circular support (3) on which the electronic unit (1) and the antenna (2) are arranged and which is fixed to the inward facing surface of the tire (6) along an outward circumferential side while an inward circumferential side of the support (3) freely protrudes into the interior of the tire.

12. An assembly as claimed in claim 11, characterized in that the antenna (2) is arranged along the circumference of the support (3) and protrudes therewith into the interior of the tire.

13. An assembly as claimed in claim 12, characterized in that the antenna (2) is arranged in the support (3) and is largely surrounded by the support material.

14. An assembly as claimed in claim 11, characterized in that the support (3) is fixed to the inner sidewall (7), which faces the center of the vehicle, of tire (6) in the area of the tire bead (10).

15. An assembly as claimed in claim 11, characterized in that the support (3) is produced by injection molding, and the support material is injection-molded around antenna (2) and electronic unit (1).

16. An assembly as claimed in claim 15, characterized in that the support (3) is made from a flexible, electrically insulating material, and the antenna (2) and the electronic unit (1) are enclosed by the material.

17. An assembly as claimed in claim 16, characterized in that the support (3) material is folded to enclose the antenna (2) and the electronic unit (1).

18. An assembly as claimed in claim 11, characterized in that the support (3) has an approximately rectangular, approximately T-shaped, or approximately L-shaped profile cross-section.

19. An assembly as claimed in claim 11, characterized in that, in the area of the electronic unit (1) the support material has a hole that represents an air duct (19) to a pressure sensor of the electronic unit (1).

* * * * *